US012519289B2

(12) United States Patent
Ruppert

(10) Patent No.: US 12,519,289 B2
(45) Date of Patent: Jan. 6, 2026

(54) CLAMPING DEVICE

(71) Applicant: PHOENIX CONTACT GMBH & CO. KG, Blomberg (DE)

(72) Inventor: Jens Ruppert, Steinheim (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 18/284,548

(22) PCT Filed: Mar. 30, 2022

(86) PCT No.: PCT/EP2022/058385
§ 371 (c)(1),
(2) Date: Sep. 28, 2023

(87) PCT Pub. No.: WO2022/207689
PCT Pub. Date: Oct. 6, 2022

(65) Prior Publication Data
US 2024/0162692 A1 May 16, 2024

(30) Foreign Application Priority Data

Apr. 1, 2021 (BE) .................................. 2021/5253

(51) Int. Cl.
H02B 1/052 (2006.01)
F16L 3/06 (2006.01)
(Continued)

(52) U.S. Cl.
CPC ................ H02B 1/202 (2013.01); F16L 3/10 (2013.01); H02B 1/052 (2013.01)

(58) Field of Classification Search
CPC . H02B 1/202; H02B 1/052; F16L 3/10; F16L 3/01; F16L 3/06; F16G 11/101; H02G 15/007; H02G 3/32
(Continued)

(56) References Cited

U.S. PATENT DOCUMENTS 2,068,902 A * 1/1937 Blunt ..................... B61D 23/00
248/74.1
4,202,087 A * 5/1980 Wilderman ............. E21B 19/24
166/243
(Continued)

FOREIGN PATENT DOCUMENTS

DE 1440738 A1 10/1969
DE 19544963 A1 6/1997
(Continued)

OTHER PUBLICATIONS

JPIPA, Office Action issued Jan. 21, 2025 in corresponding Japanese Application No. JP 2023-560688.

Primary Examiner — Nkeisha Smith
(74) Attorney, Agent, or Firm — LEYDIG, VOIT & MAYER, LTD.

(57) ABSTRACT

A clamping device for holding at least one conductor includes: a housing element having: one entry opening and one exit opening for guiding the conductor through the housing element, and a bearing surface for the conductor in the housing element, arranged at least in some regions between the entry opening and the exit opening; and a clamping element for pressing the conductor onto the bearing surface. The clamping element is arranged so as to be movable on the housing element between a first position and a second position, and, when in the second position, at least brakes at least movement of the conductor out of the entry opening counter to an insertion direction.

18 Claims, 3 Drawing Sheets

(51) Int. Cl.
*F16L 3/10* (2006.01)
*H02B 1/20* (2006.01)
(58) Field of Classification Search
USPC .......................................................... 248/74.2
See application file for complete search history.

(56) References Cited

U.S. PATENT DOCUMENTS

| | | | | |
|---|---|---|---|---|
| 4,244,083 | A * | 1/1981 | Aremka | F16L 3/10 |
| | | | | 24/459 |
| 4,312,488 | A * | 1/1982 | Pierron | F16L 3/1041 |
| | | | | 248/65 |
| 4,379,536 | A * | 4/1983 | Mizuno | F16L 3/10 |
| | | | | 403/397 |
| 4,805,479 | A * | 2/1989 | Brightwell | F16C 1/105 |
| | | | | D8/395 |
| 5,584,212 | A * | 12/1996 | Wild | F16C 1/14 |
| | | | | 74/502.6 |
| 7,114,687 | B2 * | 10/2006 | Swantner | F16L 3/10 |
| | | | | 248/74.2 |
| 10,498,120 | B2 * | 12/2019 | Dietz | F16M 13/02 |
| 10,700,449 | B2 * | 6/2020 | Serre | H01R 4/5091 |
| 2006/0242805 | A1 * | 11/2006 | Coleman | G09F 15/0025 |
| | | | | 24/462 |
| 2007/0278357 | A1 * | 12/2007 | Pizzi | F16L 3/1025 |
| | | | | 174/59 |
| 2013/0206938 | A1 * | 8/2013 | Clouser | F16M 13/022 |
| | | | | 248/219.4 |
| 2015/0181742 | A1 | 6/2015 | Lütze et al. | |
| 2019/0154008 | A1 | 5/2019 | Yagci | |

FOREIGN PATENT DOCUMENTS

| | | |
|---|---|---|
| DE | 102012014975 A1 | 5/2014 |
| DE | 202015101480 U1 | 6/2016 |
| DE | 102015013791 A1 | 4/2017 |
| FR | 2811818 A1 | 1/2002 |
| JP | S56135545 U | 10/1981 |
| JP | H02128848 U | 10/1990 |
| JP | 2003348738 A | 12/2003 |
| JP | 2008185988 A | 8/2008 |
| WO | 2019032276 A1 | 2/2019 |

* cited by examiner

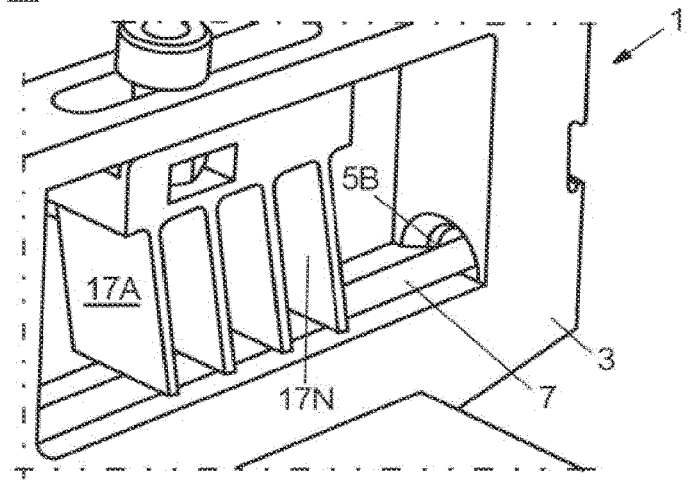
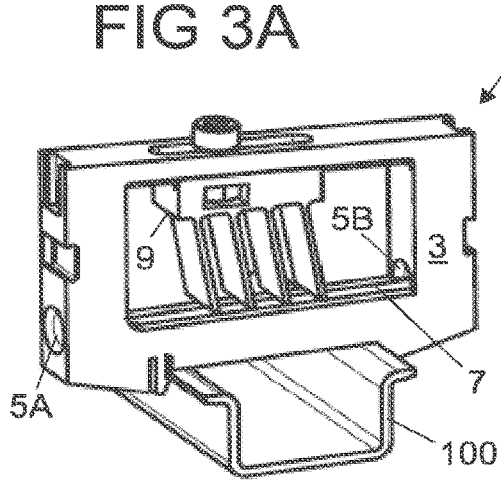
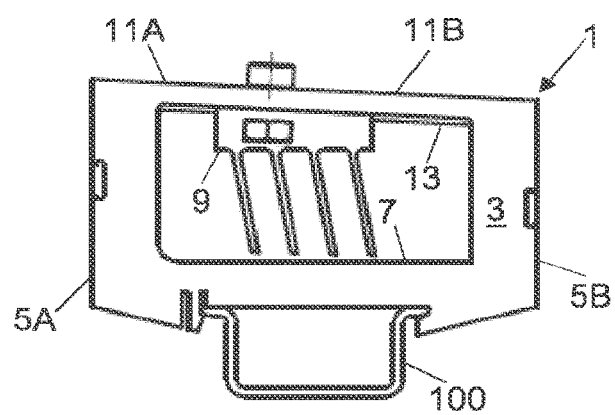
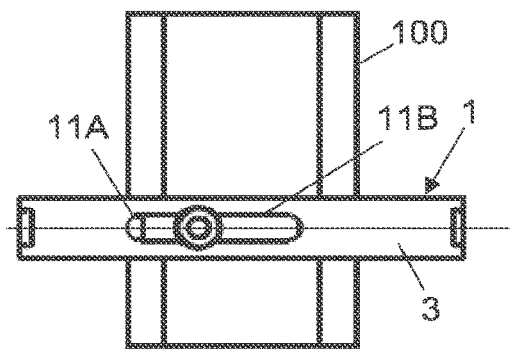
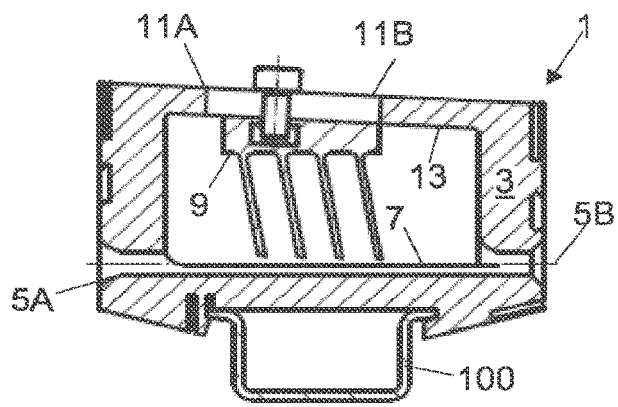

CLAMPING DEVICE

CROSS-REFERENCE TO PRIOR APPLICATIONS

This application is a U.S. National Phase application under 35 U.S.C. § 371 of International Application No. PCT/EP2022/058385, filed on Mar. 30, 2022, and claims benefit to Belgian Patent Application No. BE 2021/5253, filed on Apr. 1, 2021. The International Application was published in German on Oct. 6, 2022 as WO 2022/207689 under PCT Article 21(2).

FIELD

The invention relates to a clamping device for holding a conductor.

BACKGROUND

A clamping device of this kind has a housing element, comprising at least one entry opening and one exit opening for guiding the conductor through the housing element, and a bearing surface for the conductor in the housing element, arranged at least in some regions between the entry opening and the exit opening. Furthermore, a clamping device of this kind comprises a clamping element for pressing the conductor onto the bearing surface.

By way of example, DE 10 2012 014 975 A1 describes a clamping device of this kind to be arranged in switchgear cabinets. By means of a clamping element formed as a cable tie, a conductor can be fastened to a bearing surface of the clamping device such that the conductor is held by the clamping device.

The clamping device described in DE 20 2015 101 480 U1 is used for fastening a conductor to a junction box and is intended for fastening the conductor and for durably relieving the tension on the conductor. The conductor is fastened in the clamping device by means of cable ties, straps, or wires.

The clamping devices known from the prior art allow the conductor to be held without the conductor slipping backward or forward. However, the drawback of the clamping devices known from the prior art is that they do not allow the conductor to be detached and refastened in a simple manner, nor do they allow the conductor to be pulled through, as required when wiring the switchgear cabinet.

SUMMARY

In an embodiment, the present invention provides a clamping device for holding at least one conductor, comprising: a housing element comprising: one entry opening and one exit opening configured to guide the conductor through the housing element, and a bearing surface for the conductor in the housing element, arranged at least in some regions between the entry opening and the exit opening; and a clamping element configured to press the conductor onto the bearing surface, wherein the clamping element is arranged so as to be movable on the housing element between a first position and a second position, and is configured, when in the second position, to at least brake at least movement of the conductor out of the entry opening counter to an insertion direction.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 2 is an enlarged view of a region of the clamping device according to FIG. 1A;

FIG. 3A-3D are views of a clamping device according to the embodiment shown in FIGS. 1A, 1B, and 2.

DETAILED DESCRIPTION

Figure 1A:
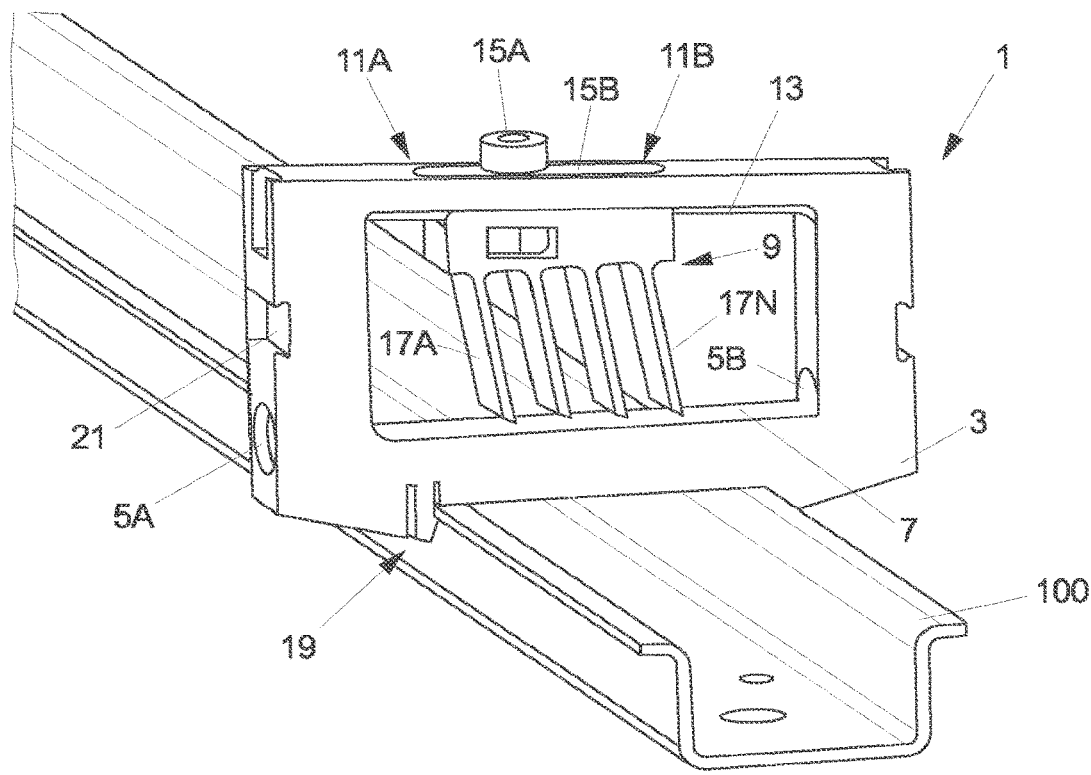
FIG. 1A is a view of a clamping device in a state mounted on a top hat rail.

In an embodiment, the present invention provides an improved clamping device that allows a conductor to be mounted and dismounted more simply and quickly.

Accordingly, the clamping element is arranged so as to be movable on the housing element between a first position and a second position and is adapted, when in the second position, to at least brake at least movement of the conductor out of the entry opening counter to an insertion direction.

Herein, a conductor can be construed as an electrical conductor, a plurality of electrical conductors, or electrical lines having, for example, plastics insulation, which can also be referred to as cables. Alternatively, the conductor can also be formed as a pipe or a tube, for example made of a flexible material, for conducting fluids, for example for using compressed air in a pneumatic system or for using a liquid as a working medium in a hydraulic system.

The housing element can be formed as a plastics part, for example similar to a terminal block. The housing element comprises an entry opening and an exit opening, which can be arranged on opposite sides of the housing element, for guiding the conductor therethrough. The two openings can therefore also be referred to as through-openings. The two openings may be arranged in surfaces of the housing element and be entirely surrounded by a material of the housing element, or may be only partly surrounded by the material of the housing element, for example may be open on one or more sides in order thus to allow the conductor to be inserted from the side.

The bearing surface can be formed in an elongate manner, for example in the manner of a web, between the entry opening and the exit opening. The bearing surface can be formed in a substantially planar manner or be adapted to the contour of the conductor at least in some regions. The conductor guided through the housing element can rest on the bearing surface and be pressed onto the bearing surface by the clamping element, so as thus to be held on the bearing surface.

The clamping element is arranged so as to be movable on the housing element between a first position and a second position and is adapted, when in the second position, to at least brake at least movement of the conductor out of the entry opening counter to an insertion direction.

For example, depending on the conductor cross section being used, the clamping element may not touch the conductor in the first position such that the conductor can be inserted into the housing element and guided through the housing element in a simple manner. The first position can therefore also be referred to as the guide-through position.

While the clamping element is moving toward the second position, the clamping element can be moved ever closer toward the conductor so as thus to press the conductor onto the bearing surface. Pressing the conductor onto the bearing surface can also be referred to as clamping the conductor fast or fastening it.

As a result of the conductor being clamped fast or fastened, movement of the conductor out of the entry opening counter to the insertion direction is at least braked.

The term "insertion direction" can be construed as a direction in which the conductor, or an end of the conductor, is first inserted into the housing element through the entry opening and then leaves the housing element again through the exit opening. By way of example, movement counter to the insertion direction can be construed as movement of the conductor out of the entry opening, for example by the conductor being pulled. The term "braking" can be construed to mean that movement of the conductor is braked or reduced by a clamping force of the clamping element, or such that the conductor can only move as a result of a tensile force that is greater than the clamping force of the clamping element by which the conductor is being held between the bearing surface and the clamping element in the housing element. For example, the term "braking" can also be construed as clamping the conductor fast in such a way as to prevent or block it from moving out of the entry opening.

When in the second position, the clamping element can be secured or locked in or on the housing element, for example by means of a screw. The second position can therefore also be referred to as the clamping position.

Advantageously, using the clamping device described herein, a conductor can be securely held by a definable clamping force so as to prevent the conductor from inadvertently slipping in the clamping device, but at the same time a user can pull the conductor through the clamping device to a desired length, for example when wiring a switchgear cabinet. Further advantageously, the clamping device described herein is suitable for different conductor cross sections since the clamping device allows the clamping to be smoothly adapted to the different conductor cross sections.

In examples, the clamping device can be formed in one piece or be constructed from a plurality of components.

In one example, the clamping element is arranged, at least in some regions in an extension direction of the conductor through the housing element, so as to be movable along an inclined plane on the housing element between the first position and the second position.

In the first position the clamping element can be located in a region at the entry opening, and in the second position the clamping element can be located in a region at the exit opening.

While the clamping element is moving toward the second position, the clamping element can be moved ever closer toward the conductor so as thus to press the conductor onto the bearing surface.

In one example, the inclined plane extends from the first position toward the second position, the distance between the clamping element and the bearing surface decreasing when the clamping element moves from the first position toward the second position.

The inclined plane can, for example, extend on an inside surface of the housing toward the exit opening. Advantageously, depending on the incline angle of the inclined plane, the clamping element can be guided or moved ever closer toward the bearing surface from the first position to the second position, so as thus to fasten the conductor between the clamping element and the bearing surface. By way of example, the inclined plane can have an incline angle of up to 5°. Depending on the desired field of use or the conductor cross sections to be used, the incline angle can also be selected to be greater than 5°.

In an alternative example, the inclined plane extends from the second position toward the first position, the distance between the clamping element and the bearing surface decreasing when the clamping element moves from the second position toward the first position.

In one example, the clamping element is arranged movably on the housing element by means of a pin-and-slot connection.

By way of example, a slot can be arranged in a top face of the housing element in a region between the entry opening and the exit opening and can extend along the bearing surface. A corresponding pin can be arranged on the clamping element and can engage in the slot, or be guided in the slot, in order thus to arrange the clamping element so as to be movable on the housing element between a first position and a second position. Advantageously, the user can move the clamping element back and forth between the first position and the second position by moving the pin forward and backward, and thus can move the clamping element closer to the bearing surface or further away from the bearing surface. By way of example, the pin can be configured in a screw-like manner and be adapted to secure the clamping element on the housing element in a desired position.

In one example, the clamping element is formed resiliently at least in some regions on a side facing the bearing surface. The clamping element can, for example, be made of a resilient material, in particular of a resilient plastics material.

As a result, a clamping element region resting on the conductor can advantageously be elastically deformed in order thus to press the conductor onto the bearing surface and simultaneously allow the conductor to be pulled through the clamping device, for example when wiring a switchgear cabinet.

In one example, the clamping element has at least one slat element, preferably a multiplicity of slat elements. Accordingly, the clamping element having slat elements can also be referred to as a comb-like clamping element.

Advantageously, the slat elements can be formed such that they exert a uniform clamping force on the regions of the conductor that are in contact with the slat elements. In addition, the slat elements can be arranged so as to extend through the housing element obliquely to the extension direction of the conductor, in order thus to make it simpler to pull the conductor through from the entry opening toward the exit opening and to make it more difficult to pull the conductor back from the entry opening.

In one example, the clamping element is formed in a cuneiform manner and is adapted to be displaceable along the inclined plane of the housing element counter to a spring force of a compression spring.

For this purpose, the housing element can also comprise the compression spring that holds the clamping element in the first position such that the clamping element can be moved on the inclined plane counter to the spring force of the compression spring.

Advantageously, the clamping element formed in a cuneiform manner can be accordingly displaced when the conductor is guided through the housing element. Movement of the conductor counter to the insertion direction causes the conductor to become wedged or jammed and thus also causes it to be stopped in said direction. This enables simple mounting. There is thus no need to guide the clamping element manually and secure the clamping element on the housing element between the first and the second position, for example by means of a screw.

In one example, the clamping element comprises a multiplicity of displaceable surface elements. During movement from the first position toward the second position, the surface elements can move toward one another in order thus to securely hold the conductor.

For example, the surface elements can be formed similarly to the elements of a diaphragm and move toward one another uniformly during the transfer to the second position.

In one example, the entry opening and/or the exit opening is/are formed in a cylindrical manner and has/have a larger diameter than the conductor.

In one example, the entry opening tapers in a funnel-shaped manner from an outside surface of the housing element toward an inside surface of the housing element and/or the exit opening tapers in a funnel-shaped manner from an inside surface of the housing element toward an outside surface of the housing element.

Advantageously, the funnel-shaped configuration of the openings allows the conductor to be guided through the housing element more simply.

In one example, the bearing surface is formed in a groove-shaped manner at least in some regions in the extension direction of the conductor through the housing element, in order to receive the conductor at least in some regions.

Advantageously, the bearing surface can have a geometry that corresponds to the conductor being used, in order thus to improve the positioning of the conductor on the bearing surface.

In one example, at least in some regions the bearing surface has a corrugated profile and/or a rubber lining for preventing the conductor from slipping on the bearing surface.

Advantageously, in addition to the clamping element, the corrugated profile and/or the rubber lining can counteract inadvertent slipping of the conductor in the clamping device.

In one example, the housing element is formed in a frame-like manner.

As a result, a central housing element region in which the clamping element can be displaced can advantageously remain free of material in order to allow the clamping device to be constructed compactly.

In one example, the housing element has a mounting portion for mounting on a top hat rail.

By way of example, the housing element can have a corresponding mounting portion for fastening the housing element to a DIN rail. Alternatively, the mounting portion can also be adapted for fastening to other known mounting rails.

In one example, the housing element is configured for arrangement on a terminal strip having terminal blocks.

For example, the housing element can have corresponding connecting elements in order to be arranged on a terminal strip in a system having different terminal blocks.

In one example, the housing element comprises at least one label carrier for receiving at least one label element.

As described above, the clamping device can be fastened to a top hat rail in the manner of a terminal block and be labeled accordingly. Advantageously, the label allows for a clear designation of the conductor guided through the clamping device.

In one example, the conductor is configured as an electrical line.

Alternatively, the conductor can also be formed as a pipe or a tube, for example made of a flexible material, for using compressed air in a pneumatic system or for using a liquid as a working medium in a hydraulic system.

FIG. 1A is a view of a clamping device 1 in a state mounted on a top hat rail 100.

The shown clamping device 1 for holding at least one conductor has a housing element 3 having an entry opening 5A and an exit opening 5B for guiding the conductor through the housing element 3. In the embodiment shown, the openings 5A, 5B are arranged on opposite sides of the housing element 3. The figure also shows that the openings 5A, 5B are arranged so as to be entirely surrounded by the material of the housing element 3. In further embodiments, however, the openings may also be only partly surrounded by the material of the housing element; for example, the openings may be open on one or more sides in order thus to allow the conductor to be inserted from the side.

Furthermore, FIG. 1A shows that the entry opening 5A tapers in a funnel-shaped manner from an outside surface of the housing element 3 toward an inside surface of the housing element 3 and the exit opening 5B also tapers in a funnel-shaped manner from the inside surface of the housing element 3 toward the outside surface of the housing element 3 in order thus to make it simpler to guide the conductor therethrough.

FIG. 1A also shows a bearing surface 7 for the conductor, which bearing surface extends in the housing element 3 between the entry opening 5A and the exit opening 5B.

The bearing surface 7 shown is formed in a web-like manner such that the conductor guided through the housing element 3 can rest on the bearing surface 7 and be pressed onto the bearing surface 7 by a definable clamping force by the clamping element 9. The bearing surface 7 and a possible embodiment of the bearing surface 7 are shown more clearly in FIG. 2.

In addition, FIG. 1A shows the clamping element 9, which is arranged in an extension direction of the conductor through the housing element 3 so as to be movable on the housing element 3 between a first position 11A and a second position 11B. In the embodiment shown, the first position 11A is arranged in the direction of the entry opening 5A and the second position 11B is arranged in the direction of the exit opening 5B. In the embodiment shown, the housing element 3 is shown in the manner of a frame, so that the clamping element 9 can be displaced in a central region of the housing element 3, which central region is free of material.

In the embodiment shown, the clamping element 9 can be moved along an inclined plane 13 on the housing element 3 between the first position 11A and the second position 11B. The inclined plane 13 extends toward the second position 11B, i.e., also toward the exit opening 5B, such that the distance between the clamping element 9 and the bearing surface 7 decreases more and more in the direction of the exit opening 5B in order thus to fasten the conductor between the clamping element 9 and the bearing surface 7. For this purpose, as shown in FIG. 1A, the clamping element 9 is arranged movably on the housing element 3 by means of a pin-and-slot connection 15A, 15B. The conductor can thus be inserted into the clamping element 9 through the entry opening 5A when the clamping element 9 is in the first position 11A or close to the first position 11A, i.e., in the direction of the entry opening 5A. By moving the clamping element 9 toward the second position 11B, the conductor can be fastened between the clamping element 9 and the bearing surface 7.

The slot 15B shown is arranged in a top face of the housing element 3 in a region between the entry opening 5A and the exit opening 5B and extends along the bearing surface 7. The corresponding pin 15A is arranged on the clamping element 9 and engages in the slot 15B in order to be guided in the slot 15B between the first position 11A and the second position 11B. In the embodiment shown, an end of the pin 15A facing away from the housing element 3 is equipped with a head to make it easier for a user to move the pin 15A forward and backward and thus adjust the position. The pin 15A can be formed in the manner of a screw such that the user can secure the position of the clamping element 9 by turning the screw-like pin 15A.

In addition, FIG. 1A shows slat elements 17A-17N, which are arranged on the clamping element 9 and point in the direction of the bearing surface 7.

When the conductor is inserted, the slat elements 17A-17N can rest on the conductor and exert a uniform, defined clamping force on the conductor depending on the position of the clamping element 9 between the first position 11A and the second position 11B, but they simultaneously allow the conductor to be pulled through the clamping device 1, for example when wiring a switchgear cabinet.

The housing element 3 shown in FIG. 1A also has a corresponding mounting portion 19 in order to be able to arrange the housing element 3, as shown, on a top hat rail 100, for example together with one or more terminal blocks.

In addition, in the embodiment shown, a label carrier 21 for receiving at least one label element is arranged on the housing element 3 in order to be able to clearly designate the conductor guided through the clamping device 1 by using a label.

Figure 1B:
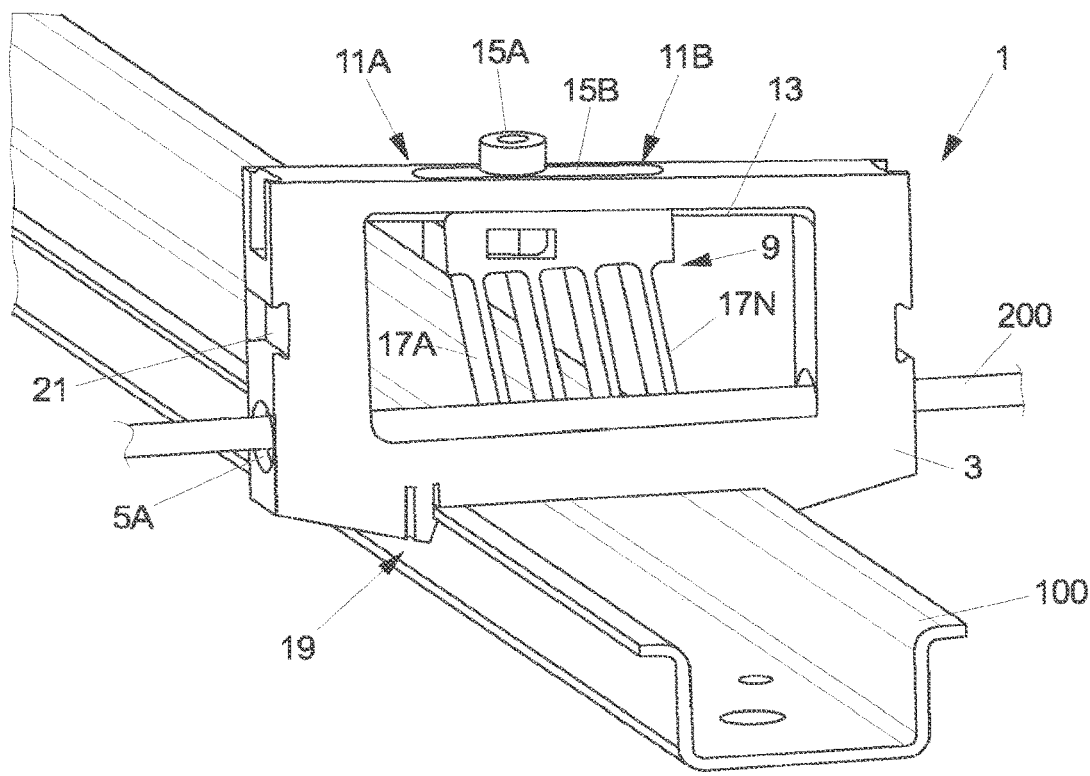
FIG. 1B is a view of the clamping device according to FIG. 1A, the clamping device being shown with a conductor guided through the housing element.

FIG. 1B is a view of the clamping device 1 shown previously in FIG. 1A with a conductor 200 guided through the housing element 3 and clamped fast. In the embodiment shown, the conductor 200 shown can be one or more electrical conductors having plastics insulation. Alternatively, in other embodiments, the conductor can also be formed as a pipe or a tube for conducting fluids.

FIG. 2 is an enlarged view of a region of the clamping device 1 shown previously in FIG. 1A. As shown in FIG. 2, the bearing surface 7 is formed in a groove-shaped manner in the extension direction of the conductor through the housing element 3, in order to receive the conductor at least in some regions, so as thus to improve the positioning of the conductor on the bearing surface 7.

FIG. 3A-3D are views of the clamping device 1 according to the previously shown embodiment.

The side view shown in FIG. 3B and the sectional view shown in FIG. 3D (along the midline shown in FIG. 3C) show the inclined plane 13, which extends on the housing element 3 toward the exit opening 5B such that the distance between the clamping element 9 and the bearing surface 7 decreases more and more as the clamping element 9 moves toward the exit opening 5B.

FIG. 4A-4D are views of a clamping device 1' according to a further embodiment.

The embodiment of a clamping device 1' shown in FIG. 4A-4D for holding at least one conductor (like the clamping device 1 already shown previously in the drawings) has a housing element 3' having an entry opening 5A' and an exit opening 5B' for guiding the conductor through the housing element 3'.

Figure 4A:
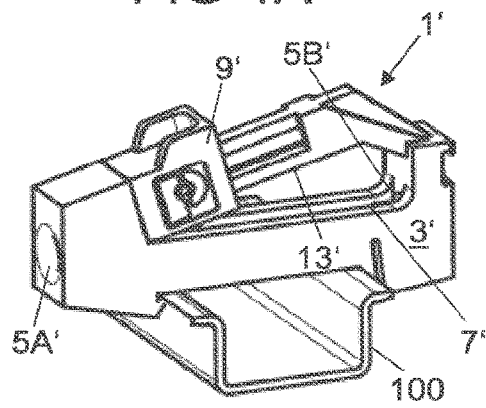
FIG. 4A-4D are views of a clamping device according to a further embodiment.
Figure 4B:
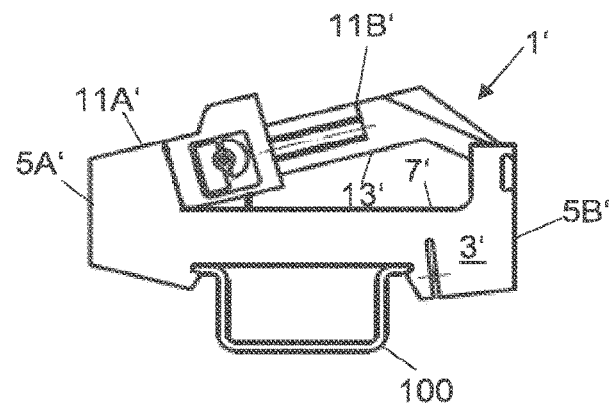
Figure 4C:
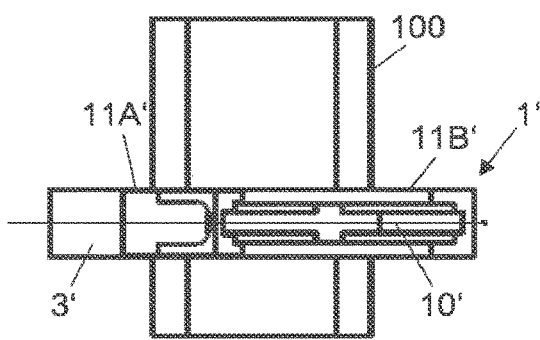
Figure 4D:
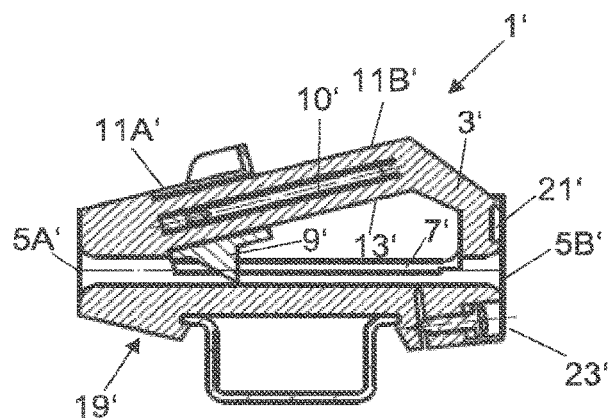

FIG. 4A-4D also show a bearing surface 7' for the conductor, which bearing surface extends in the housing element 3' between the entry opening 5A' and the exit opening 5B'. In the embodiment shown, the clamping element 9' is formed in a cuneiform manner at least in the region that comes into contact with the conductor, and is displaceable along the inclined plane 13' of the housing element 3' counter to a spring force of a compression spring 10'. FIG. 4D, a sectional view along the midline shown in FIG. 4C, shows that the compression spring 10' holds the clamping element 9' in the first position 11A' such that the clamping element 9' can be moved on the inclined plane 13' toward the second position 11B' counter to the spring force of the compression spring 10'. Movement of the inserted conductor counter to the feed direction, i.e., pulling of the conductor out of the entry opening 5A', causes the conductor to become wedged or jammed and thus also causes it to be stopped in said direction.

In addition, FIGS. 4A, 4B, and 4D show that the inclined plane 13' extends from the second position 11B' toward the first position 11A', the distance between the clamping element 9' and the bearing surface 7' decreasing when the clamping element 9' moves from the second position 11B' toward the first position 11A'.

In addition, FIG. 4D shows a clamping screw 23' in order to be able to arrange the housing element 3' securely on a top hat rail 100.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1, 1' Clamping device
3, 3' Housing element
5A, 5A' Entry opening
5B, 5B' Exit opening
7, 7' Bearing surface
9, 9' Clamping element
10' Compression spring 11A, 11A' First position
11B, 11B' Second position
13, 13' Inclined plane
15A Pin
15B Slot
17A-17N Slats
19, 19' Mounting portion
21, 21' Label carrier
23' Clamping screw
100 Top hat rail
200 Conductor

The invention claimed is:

1. A clamping device for holding at least one conductor, comprising:
a housing element comprising:
one entry opening and one exit opening configured to guide the conductor through the housing element, and
a bearing surface for the conductor in the housing element, arranged at least in some regions between the entry opening and the exit opening; and
a clamping element configured to press the conductor onto the bearing surface,
wherein the clamping element is arranged so as to be movable on the housing element between a first position and a second position, and is configured, when in the second position, to at least brake at least movement of the conductor out of the entry opening counter to an insertion direction,
wherein the clamping element is arranged, at least in some regions, in an extension direction of the conductor through the housing element so as to be movable along an inclined plane on the housing element between the first position and the second position, and
wherein the clamping element is formed resiliently at least in some regions on a side facing the bearing surface.

2. The clamping device of claim 1, wherein the inclined plane extends from the first position toward the second position, a distance between the clamping element and the bearing surface decreasing when the clamping element moves from the first position toward the second position, or
wherein the inclined plane extends from the second position toward the first position, a distance between the clamping element and the bearing surface decreasing when the clamping element moves from the second position toward the first position.

3. The clamping device of claim 1, wherein the clamping element is arranged movably on the housing element by a pin-and-slot connection.

4. The clamping device of claim 1, wherein the clamping element has at least one slat element.

5. The clamping device of claim 4, wherein the at least one slat element comprises a plurality of slat elements.

6. The clamping device of claim 1, wherein the clamping element is cuneiform and is configured to be displaceable along the inclined plane of the housing element counter to a spring force of a compression spring.

7. The clamping device of claim 1, wherein the entry opening and/or the exit opening is/are cylindrical and has/have a greater diameter than the conductor.

8. The clamping device of claim 1, wherein the entry opening tapers funnel-shaped from an outside surface of the housing element toward an inside surface of the housing element, and/or
wherein the exit opening tapers funnel-shaped from an inside surface of the housing element toward an outside surface of the housing element.

9. The clamping device of claim 1, wherein the bearing surface is groove-shaped at least in some regions in an extension direction of the conductor through the housing element so as to receive the conductor at least in some regions.

10. The clamping device of claim 1, wherein, at least in some regions, the bearing surface has a corrugated profile and/or a rubber lining for preventing the conductor from slipping on the bearing surface.

11. The clamping device of claim 1, wherein the housing element comprises a frame.

12. The clamping device of claim 1, wherein the housing element has a mounting portion configured to mount on a top hat rail.

13. The clamping device of claim 1, wherein the housing element comprises at least one label carrier configured to receive at least one label element.

14. The clamping device of claim 1, wherein the conductor comprises an electrical cable.

15. A clamping device for holding at least one conductor, comprising:
a housing element comprising:
one entry opening and one exit opening configured to guide the conductor through the housing element, and
a bearing surface for the conductor in the housing element, arranged at least in some regions between the entry opening and the exit opening; and
a clamping element configured to press the conductor onto the bearing surface,
wherein the clamping element is arranged so as to be movable on the housing element between a first position and a second position, and is configured, when in the second position, to at least brake at least movement of the conductor out of the entry opening counter to an insertion direction, and
wherein the clamping element is formed resiliently at least in some regions on a side facing the bearing surface.

16. The clamping device of claim 15, wherein the clamping element has at least one slat element.

17. The clamping device of claim 16, wherein the at least one slat element comprises a plurality of slat elements.

18. A clamping device for holding at least one conductor, comprising:
a housing element comprising:
one entry opening and one exit opening configured to guide the conductor through the housing element, and
a bearing surface for the conductor in the housing element, arranged at least in some regions between the entry opening and the exit opening; and
a clamping element configured to press the conductor onto the bearing surface,
wherein the clamping element is arranged so as to be movable on the housing element between a first position and a second position, and is configured, when in the second position, to at least brake at least movement of the conductor out of the entry opening counter to an insertion direction,
wherein, at least in some regions, the bearing surface has a corrugated profile and/or a rubber lining for preventing the conductor from slipping on the bearing surface, and wherein the clamping element is formed resiliently at least in some regions on a side facing the bearing surface.

* * * * *